(12) United States Patent
Blackstock et al.

(10) Patent No.: US 10,155,168 B2
(45) Date of Patent: Dec. 18, 2018

(54) SYSTEM AND METHOD FOR ADAPTABLE AVATARS

(71) Applicant: Snap Inc., Santa Monica, CA (US)

(72) Inventors: Jacob Edward Blackstock, Toronto (CA); David James Kennedy, Toronto (CA); Shahan Panth, Toronto (CA); Dorian Franklin Baldwin, Toronto (CA)

(73) Assignee: Snap Inc., Santa Monica, CA (US)

( * ) Notice: Subject to any disclaimer, the term of this patent is extended or adjusted under 35 U.S.C. 154(b) by 301 days.

(21) Appl. No.: 13/979,974

(22) PCT Filed: May 8, 2013

(86) PCT No.: PCT/CA2013/000454
§ 371 (c)(1),
(2) Date: Jul. 16, 2013

(87) PCT Pub. No.: WO2013/166588
PCT Pub. Date: Nov. 14, 2013

(65) Prior Publication Data
US 2014/0160149 A1 Jun. 12, 2014

Related U.S. Application Data

(60) Provisional application No. 61/644,057, filed on May 8, 2012.

(51) Int. Cl.
*A63F 13/79* (2014.01)
*G06N 3/00* (2006.01)
(Continued)

(52) U.S. Cl.
CPC .............. *A63F 13/79* (2014.09); *A63F 13/35* (2014.09); *A63F 13/537* (2014.09); *A63F 13/63* (2014.09);
(Continued)

(58) Field of Classification Search
None
See application file for complete search history.

(56) References Cited

U.S. PATENT DOCUMENTS 6,038,295 A 3/2000 Mattes
6,980,909 B2 12/2005 Root et al.
(Continued)

FOREIGN PATENT DOCUMENTS

CA 2887596 A1 7/2015
WO WO-2013166588 A1 11/2013

OTHER PUBLICATIONS

WIPO, International Search Report and Written Opinion for PCT Application No. PCT/CA2013/000454 dated Aug. 20, 2013.
(Continued)

*Primary Examiner* — Hilina K Demeter
(74) *Attorney, Agent, or Firm* — Schwegman Lundberg & Woessner, P.A.

(57) ABSTRACT

There is disclosed a system and method of providing adaptable avatars. In an embodiment, the method comprises: designing an avatar with components for a first service environment; saving the avatar components; retrieving the avatar components from a second service environment; and rendering a new version of that avatar for the second service environment using the saved avatar components.

6 Claims, 6 Drawing Sheets

(51) Int. Cl.
*G06T 11/00* (2006.01)
*A63F 13/35* (2014.01)
*A63F 13/537* (2014.01)
*A63F 13/63* (2014.01)

(52) U.S. Cl.
CPC .............. *G06N 3/006* (2013.01); *G06T 11/00* (2013.01); *A63F 2300/5553* (2013.01); *A63F 2300/6018* (2013.01)

(56) References Cited

U.S. PATENT DOCUMENTS

| | | | |
|---|---|---|---|
| 7,173,651 B1 | 2/2007 | Knowles | |
| 7,411,493 B2 | 8/2008 | Smith | |
| 7,535,890 B2 | 5/2009 | Rojas | |
| 8,130,219 B2 * | 3/2012 | Fleury | G06T 17/00 345/418 |
| 8,131,597 B2 | 3/2012 | Hudetz | |
| 8,199,747 B2 | 6/2012 | Rojas | |
| 8,332,475 B2 | 12/2012 | Rosen et al. | |
| 8,484,158 B2 * | 7/2013 | DeLuca | G06F 3/04815 707/609 |
| 8,597,121 B2 * | 12/2013 | Andres Del Valle | A63F 13/12 463/36 |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,892,999 B2 * | 11/2014 | Nims | A63B 24/0059 715/706 |
| 8,909,679 B2 | 12/2014 | Roote et al. | |
| 8,935,656 B2 * | 1/2015 | Dandia | G06F 9/4446 717/103 |
| 8,995,433 B2 | 3/2015 | Rojas | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,241,184 B2 * | 1/2016 | Weerasinghe | H04N 21/4312 |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,641,870 B1 | 5/2017 | Cormie et al. | |
| 2007/0218987 A1 * | 9/2007 | Van Luchene | A63F 13/10 463/30 |
| 2009/0144639 A1 * | 6/2009 | Nims | A63B 24/0059 715/757 |
| 2009/0150778 A1 * | 6/2009 | Nicol, II | A63F 13/10 715/706 |
| 2009/0319178 A1 | 12/2009 | Khosravy et al. | |
| 2009/0328122 A1 | 12/2009 | Amento et al. | |
| 2010/0011422 A1 * | 1/2010 | Mason | G06F 21/33 726/5 |
| 2010/0083140 A1 * | 4/2010 | Dawson | A63F 13/12 715/757 |
| 2010/0100828 A1 | 4/2010 | Khandelwal et al. | |
| 2010/0121915 A1 * | 5/2010 | Wang | A63F 13/12 709/203 |
| 2011/0202598 A1 | 8/2011 | Evans et al. | |
| 2011/0239136 A1 * | 9/2011 | Goldman | G06N 3/006 715/757 |
| 2011/0239143 A1 * | 9/2011 | Ye | G06F 3/048 715/764 |
| 2012/0013770 A1 | 1/2012 | Stafford et al. | |
| 2012/0209924 A1 | 8/2012 | Evans et al. | |
| 2013/0155169 A1 * | 6/2013 | Hoover | H04N 7/157 348/14.02 |
| 2017/0113140 A1 | 4/2017 | Blackstock et al. | |
| 2018/0113587 A1 | 4/2018 | Allen et al. | |

OTHER PUBLICATIONS

Leyden, John. "This SMS will self-destruct in 40 seconds", [Online]. Retrieved from the Internet: <URL: http://www.theregister.co.uk/2005/12/12/stealthtext/, (Dec. 12, 2005), 1 pg.

"U.S. Appl. No. 15/369,499, Non Final Office Action dated Aug. 15, 2018", 22 pgs.

"U.S. Appl. No. 16/115,259, Preliminary Amendment filed Oct. 18, 2018 t", 6 pgs.

\* cited by examiner

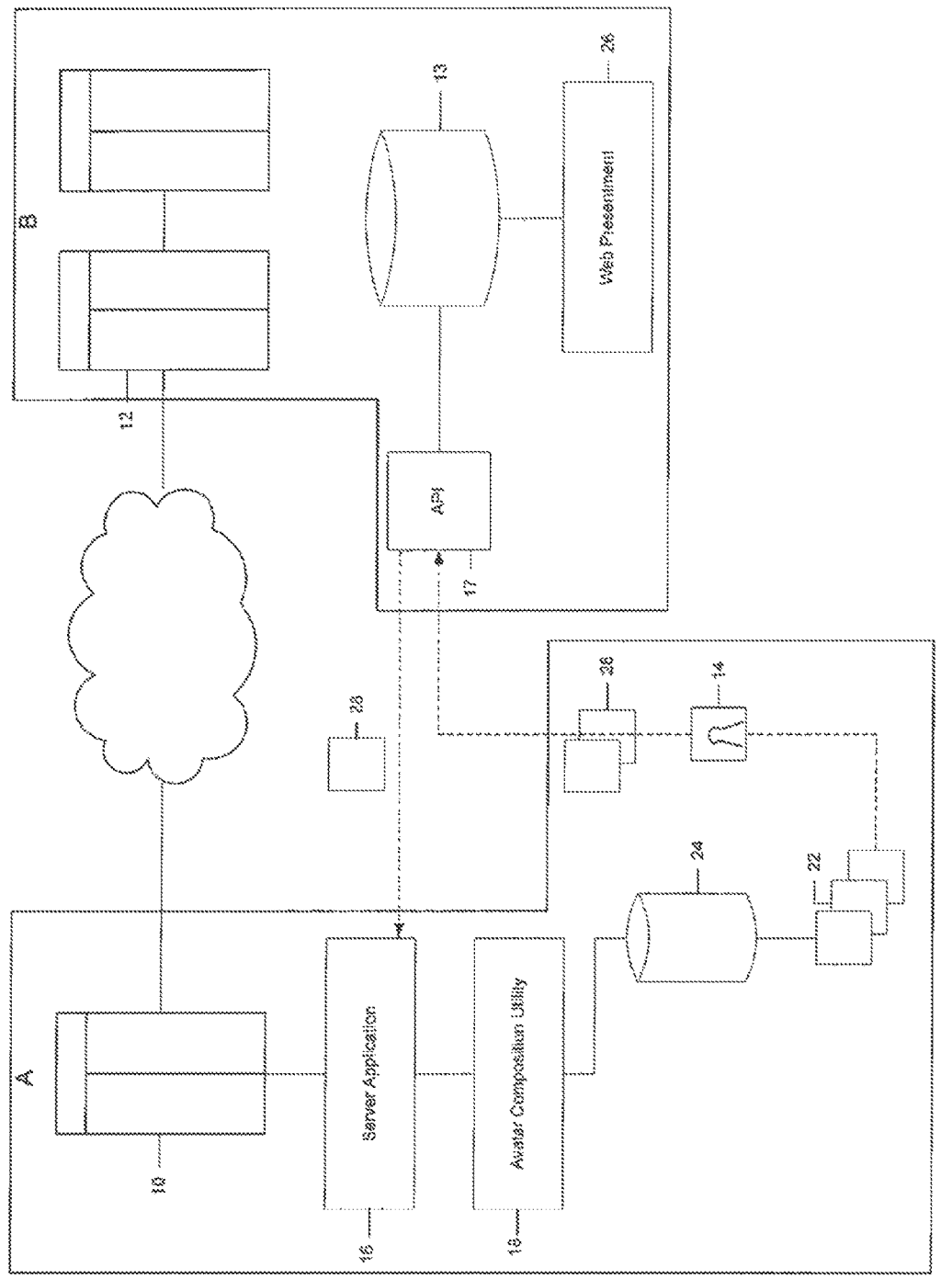

| | File | ID | Category name | Category type | Gender | Sub_category_1 | Sub_category_2 | State_1 | State_2 |
|---|---|---|---|---|---|---|---|---|---|
| Hairstyle | [image] | hairstyle_1 | hairstyle | 1 | 2 | hair_short | hair_straight | | |
| | [image] | hairstyle_2 | hairstyle | 1 | 2 | hair_short | hair_straight | | |
| | [image] | hairstyle_3 | hairstyle | 1 | 2 | hair_medium | hair_wavy | | |
| Eyes | [image] | eyes_1 | eyes | 1 | 0 | round | | eyes_open | eyes_happy |
| | [image] | eyes_2 | eyes | 1 | 0 | round | | eyes_closed | eyes_sad |
| | [image] | eyes_3 | eyes | 1 | 0 | round | | eyes_squinting | eyes_mad |
| Noses | [image] | nose_1 | nose | 1 | 2 | nose_straight | | | |
| | [image] | nose_2 | nose | 1 | 2 | nose_straight | | | |
| | [image] | nose_3 | nose | 1 | 2 | nose_round | | | |
| Jaws | [image] | jaw_1 | jaw | 1 | 2 | | | | |
| | [image] | jaw_2 | jaw | 1 | 2 | | | | |
| | [image] | jaw_3 | jaw | 1 | 2 | | | | |
| Mouth | [image] | mouth_1 | mouth | 1 | 0 | lips_none | | mouth_closed | mouth_neutral |
| | [image] | mouth_2 | mouth | 1 | 0 | lips_none | | mouth_open | mouth_smiling |
| | [image] | mouth_3 | mouth | 1 | 0 | lips_none | | mouth_open_wide | mouth_frowning |
| Headwear | [image] | headwear_1 | headwear | 2 | 0 | | | | |
| | [image] | headwear_2 | headwear | 2 | 0 | | | | |
| | [image] | headwear_3 | headwear | 2 | 0 | | | | |
| Height | [image] | body_1 | body_height | 2 | 2 | | | | |
| | [image] | body_2 | body_height | 2 | 2 | | | | |
| | [image] | body_3 | body_height | 2 | 2 | | | | |

Fig. 2

SYSTEM AND METHOD FOR ADAPTABLE AVATARS

CROSS REFERENCE TO RELATED APPLICATIONS

This application claims all benefit, including priority, of U.S. Provisional Patent Application Ser. No. 61/644,057, filed May 8, 2012, entitled SYSTEM AND METHOD FOR ADAPTABLE AVATARS, the entire contents of which is incorporated herein by this reference.

FIELD OF THE INVENTION

The present invention relates generally to providing user representations in computing environments. The present invention further relates to managing a particular user's representation in avatar form in computing environments.

BACKGROUND OF THE INVENTION

Environments that use avatars to represent users typically provide their own avatar creation tools. An avatar created by a user in one online environment is usually confined to that environment, so for each new environment, the user typically must create a separate, different avatar. To update characteristics of multiple avatars, the user must change each avatar separately within each environment, which can be time consuming.

Despite the apparent inefficiency of such a system, having a multiplicity of avatars may serve a practical purpose. Just as in real life, digital users exist in multiple contexts and may require different identities in different environments; for example, one identity for work, another for family and friends, another for video games, others for interests and hobbies, and so on. A different avatar in each situation allows the user to present a contextually relevant appearance.

Nevertheless, as the number of digital environments grows, the user is compelled to create and manage an ever-increasing number of avatars, which creates a disincentive to design a separate avatar for each new environment. This reduces the value of avatars generally, and for environments that use avatars, adds a barrier to adoption.

There are mechanisms that attempt to solve this problem by enabling users to use the same avatar in multiple environments, such as one disclosed by Mason et al. in U.S. patent application Ser. No. 12/279,643 (published as US 2010/0011422 A1).

However, such mechanisms require an avatar to be rendered identically in each environment, and therefore fail to provide the avatar's fundamental benefits, which include giving the user a contextually relevant identity, and each environment a consistent look and feel.

Therefore, what is needed is a solution to address at least some of these limitations.

SUMMARY OF THE INVENTION

In accordance with an aspect of the present invention, the present disclosure relates to a system and method for providing avatars adaptable to multiple environments. Avatar means any representation of a user, which may be manifested visually in an environment. For example, an avatar may be manifested as a character in a video game, a user profile picture in a social networking website, or an emoticon in a messaging application, etc. Environment in this disclosure broadly means any environment where an avatar may be manifested. For example, an environment may be an avatar creation application, video game, social networking website, messaging application, smartphone address book, or any other application where a user may want to have a representation.

In accordance with an aspect of the present invention, more particularly, the system and method provides data about an avatar's components, such as discrete facial and bodily features, and the relative positions of the features to another, for the purpose of rendering different versions of a user's avatar which may be visually adapted to suit multiple environments.

In accordance with an aspect of the present invention, the system and method enables data about a single avatar to be adapted and re-rendered in multiple environments in a virtually unlimited number of ways. This allows service providers (such as operators of a service environment) to reap the benefits of providing avatars designed to visually match their environments, while relieving the user of the need to create a new avatar specifically for each service. The user can instead create an avatar in one environment, and link the avatar data to a user account in a second environment. The avatar can then be automatically re-rendered with the second environment's art set using avatar data from the first environment. The second environment can therefore choose not to offer an avatar creation tool at all, yet still give the user the full experience of interacting in its environment with a relevant and personalized avatar.

In accordance with an aspect of the present invention, there is provided a method comprising: a first computing device maintaining avatar data describing at least one avatar component of a first avatar designed for a first service environment, the avatar data associated with an identifier; the first computing device receiving a request from a second service environment, the request including identification data and at least one requested avatar component; based at least partly on a correspondence between the respective identifier and the received identification data, the first computing device transmitting to the second service environment the avatar data describing the at least one avatar component corresponding to the at least one requested avatar component type; and the second service environment generating a second avatar for a second service environment based at least partly on the avatar data received from the first computing device.

In accordance with an aspect of the present invention, in this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

In the drawings, embodiments of the invention are illustrated by way of example. It is to be expressly understood that the description and drawings are only for the purpose of illustration and as an aid to understanding, and are not intended as a definition of the limits of the invention.

FIG. 1 illustrates an example of a computer network implementation of the system of the present invention.

FIG. 2 is a table showing an example of avatar data in accordance with the present invention.

DETAILED DESCRIPTION

Figure 3A:
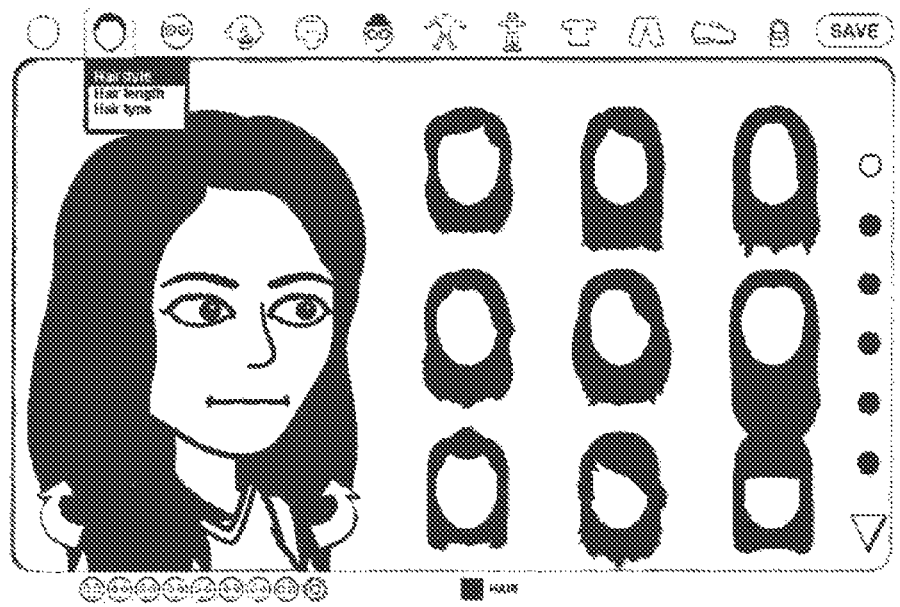
FIGS. 3a, 3b, 3c, and 3d show examples of an avatar composition utility.

As noted above, the present disclosure relates to a system and method for providing avatars adaptable to multiple environments.

In an aspect, the system and method enables data about a single avatar to be adapted and re-rendered in a virtually unlimited number of ways. This is achieved by generating data about an avatar's discrete facial and bodily features, and each feature's relative position to another, for the purpose of rendering different versions of that avatar which are visually adapted to suit multiple service environments.

This allows a service provider to reap the benefits of providing users with avatars that visually match its service environment, while relieving the user of the requirement to create a separate avatar specifically for that service.

Avatars are typically designed and intended for use in a bounded environment, such as a web portal, branded application or website, or video game. Avatars in each service environment may have a distinct look and feel, and services that use avatars may not want to allow sharing of their avatars for use in other environments.

To address the need for each environment to maintain its own look and feel, and simultaneously eliminate the time and effort required of users to create a new avatar in each environment, the present system and method reduces an avatar to a data set of components, which may be used to re-render a different version of that avatar matched to the look and feel of another environment. This effectively adapts the avatar into something new in each environment, while the use of a common data set of components provides a consistency between different versions of the avatar in different environments.

An adaptable avatar designed to be location and appearance-agnostic benefits an environment by automatically customizing an avatar that is appropriate to its look and feel, and provides the user with control over a consistent set of components for personalized avatars across multiple environments.

Various aspects of the present system and method will now be described in more detail with reference to the figures.

Referring to FIG. 1 an example of the implementation of the present invention is illustrated, as a computer network implemented system. It should be understood that FIG. 1 illustrates only one possible computer network architecture for implementing the present invention, but the invention is not limited to the particular implementation shown in FIG. 1.

FIG. 1 illustrates a first environment A linked to a server computer (10) and a second environment B linked to a server farm (12). In the implementation shown in FIG. 1, environment A acts as a host environment or service environment for enabling an avatar (14) to be rendered in one or more other environments, in this case second environment B.

Server computer (10) is linked to a server application (16) that includes an avatar composition utility (18). The server farm (12) may also include an application repository (13). Linked to the application repository (13) is an Application Programming Interface (17) or "API". The avatar composition utility (18) allows one or more authorized users of the first environment A to create the avatar (14), following the workflow explained in greater detail below. The avatar (14) is rendered using a data set of components (22). The data set of components (22) is stored to a database (24). The second environment B may include for example a web presentment utility (26) that presents a series of Internet pages, based on one or more requests of a user via a browser (not shown). One or more of the requests may relate to presentment of an avatar, one or more operations involving an avatar, or online context for the avatar, as determined by the web presentment utility (26), including based on one or more applications linked to the server farm (12). These requests are received by the API (17), and optionally the API (17) interprets these requests so as to generate and communicate to the server computer (10) a request (28) that is actionable by the server computer (10). As explained below, the request (28) may include information for authenticating the request (28) as being associated with the user, by providing for example authentication data for the user. The server computer (10) acts on the request (28) by interpreting the request (28) and based on this interpretation accessing relevant portions of a profile (30) associated with the user, which includes or is linked to the data set of components (22). The relevant portions of the profile (30) will consist of those portions that are responsive to the request (28) in that they contain the information required for the second environment B to render the avatar (14), using the API (17), so as to present the avatar (14) in a way that complies with the attributes of the presentment of the avatar (14), the one or more operations involving an avatar (14), or online context for the avatar (14), required by the second environment B.

In this way, the avatar (14) is rendered to the second environment B in a responsive and contextually relevant way, without the need to deploy substantial infrastructure on at the server farm (12), i.e. only the API (17) is required.

Avatars may be created from avatar data saved or maintained by a computing device 100. FIG. 2 shows a table illustrating non-limiting examples of avatar components. An avatar component may be described by a component field and corresponding avatar component data. As shown in FIG. 2 the avatar components may be given a hierarchical structure that supports the selective extraction of features based on requests from the API, as described above, the organization of data components in different types some of which may constitute primary and secondary elements or features. In one implementation primary features may be persistent while secondary features may be more likely to be filtered out in favor of use of a feature associated with an online environment. This file structure enables the mixing of features from the avatar component data and avatar components of a different online environment so as to adapt the avatar to the different online environment.

Avatar components are combined to form an avatar using an avatar composition utility. Operation of the avatar composition utility is illustrated (FIG. 3). Avatar components may be generated by a service environment (referred to as "Environment A"), and avatar component data may be assigned to each component, such as a component's category name, category type, gender, subcategory name, and state. A component's category name may refer to hairstyle, eyes, nose, jaw, mouth shape, etc. A component's category type may indicate whether the component is a primary avatar component or secondary avatar component. A component's gender may indicate whether the component is for male avatars, female avatars, or for either gender. A component's subcategory name may provide further categorization of the component. A component's state may provide contextual or situational information about the component's appearance. For example, a component may be assigned the category name "mouth", category type "primary", gender "either", subcategory "thin", and states "smiling" and "open". Other avatar component data may be assigned to each component, such as a filename and ID. Together, all avatar components comprise an avatar dataset. Avatar datasets may be stored on a computer server and may be made accessible to one or more third party service environments through an Application Programming Interface ("API"). A third party environment may be referred to as "Environment E" throughout this specification.

Each of the service environments may operate on a respective computing device (e.g. a computer server) or be associated with a respective computing device. Each service environment may also be associated with or operate on a single computing device, in the case of a videogame console or personal computer operating multiple games or applications locally. Each service environment may define its own avatar definitions and requirements. For example, while Environment A may require avatar components related to the avatar's face and body, Environment E may only require avatar components related to the avatar's face.

Avatars may be created locally on a particular computing device for a service environment, and then transmitted to a computer server configured with operating or maintaining some aspects of the service environment. The computer server may maintain each avatar dataset created in this way, and make avatar datasets, or data derived therefrom, available to other service environments operating either on the same computer server, or on a different computing device.

Now referring to FIGS. 3a, 3b, 3c, and 3d, shown is a possible embodiment of the avatar composition utility, and a possible workflow enabled by this utility. An avatar composition utility may present avatar components to a user, which the user may individually or collectively select and then customize by repositioning and resizing and choosing colors.

FIG. 3a shows a menu of icons representing lists of different avatar components that a user can select from, such as hair, eyes, body shape and clothing. Each list may include categories and subcategories of components. In FIG. 3a, a user can select subcategories such as long hair and straight hair to view and select from a list of all avatar hairstyles with long and straight hair. When a user selects a particular component, it is added to the user's avatar profile in the form of avatar data, including the component's ID, and applicable category, subcategories, state, color, etc.

Figure 3B:
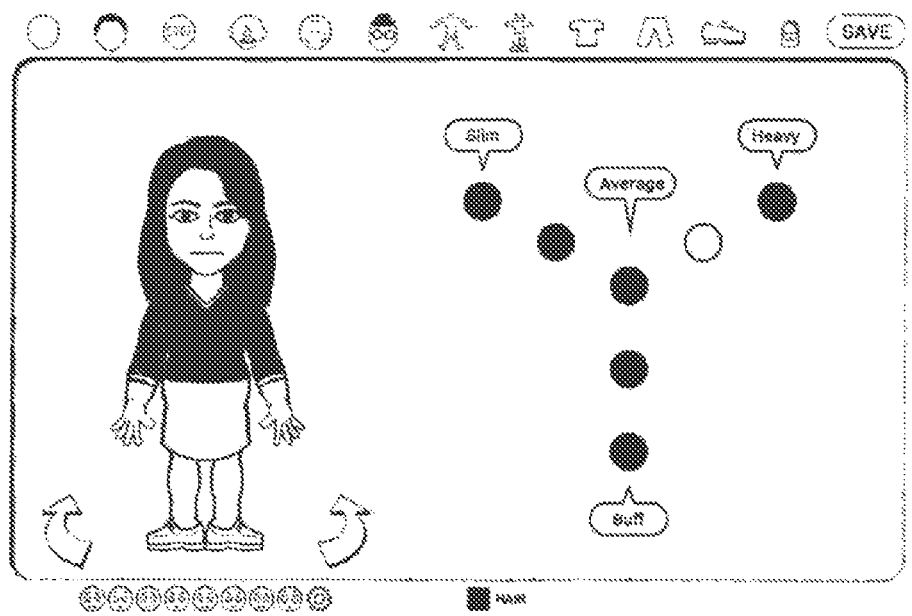

FIG. 3b shows a further aspect of the avatar composition utility, namely a tool to select different body shape components, such as slim, heavy, buff and average. When a user selects a particular body shape component, it is added to the user's avatar profile in the form of avatar data, including the component's ID, and applicable category, subcategories, state, color, etc.

Figure 3C:
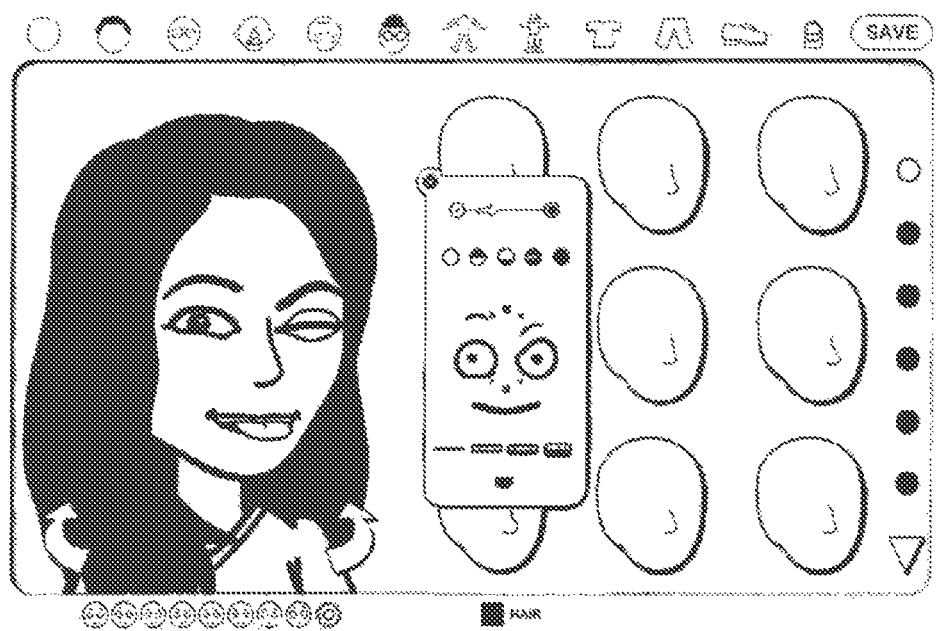

FIG. 3c shows a further aspect of the avatar composition utility, in which users may access a menu for selecting avatar state data. For example, the avatar's states include left eye component equal to mad and closed, left eyebrow equal to mad, right eye equal to happy and open, right eyebrow equal to happy, mouth equal to smiling and open, tongue equal to out, etc. When selected, these states are individually added to the user's avatar profile, and collectively added as avatar emotion data, such as happy or joking.

Figure 3D:
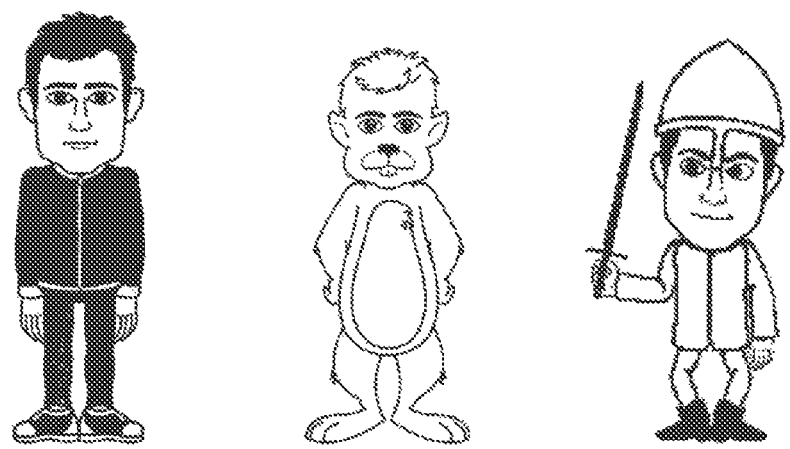

FIG. 3d illustrates the adaptive features of the present invention. It shows different versions of the same avatar, as created and then adapted using the present invention. The avatar on the far left may be the original avatar, and then on the right are two different versions, each being adapted in separate environments with access to the same avatar data. The avatar in the middle has components that correspond to the original avatar on the far left, rendered with its own avatar components in its own visual style, such as hairstyle and eye color, mapped using the system's API. Some components of the middle avatar do not have corresponding components in the original avatar, such as fur color and the snout. In this instance, these components have been mapped to other components in the original avatar: fur color has been mapped to skin tone and snout has been mapped to nose. The result is an adapted avatar with the appearance of a different species, yet individually adapted features that combine to retain the essence of the original avatar. The avatar on the far right has components that correspond to the original avatar on the far left, rendered with its own avatar components in its own visual style, such as hair length, hair color, eye color, skin tone and face shape, mapped using the system's API. Examples of components that have not been mapped include avatar height and component states. However, avatar emotion data has been mapped so that the original avatar profile can communicate through the API whether the avatar is happy, sad, etc., and the adapted avatar can update with the appropriate changes. The avatar also includes new components not present in the original avatar, such as sword and helmet, and new body proportions such as oversized head.

The avatar composition utility may embody one or more user workflows for guiding a user through the steps involved in creating an avatar, or modifying an existing avatar. The avatar composition utility may also access one or more avatar templates or "types", where each template or type constitutes a collection of components which may be organized hierarchically into component categories and component sub-categories. These components may relate to visual components of the avatar, as described above.

Figure 4:
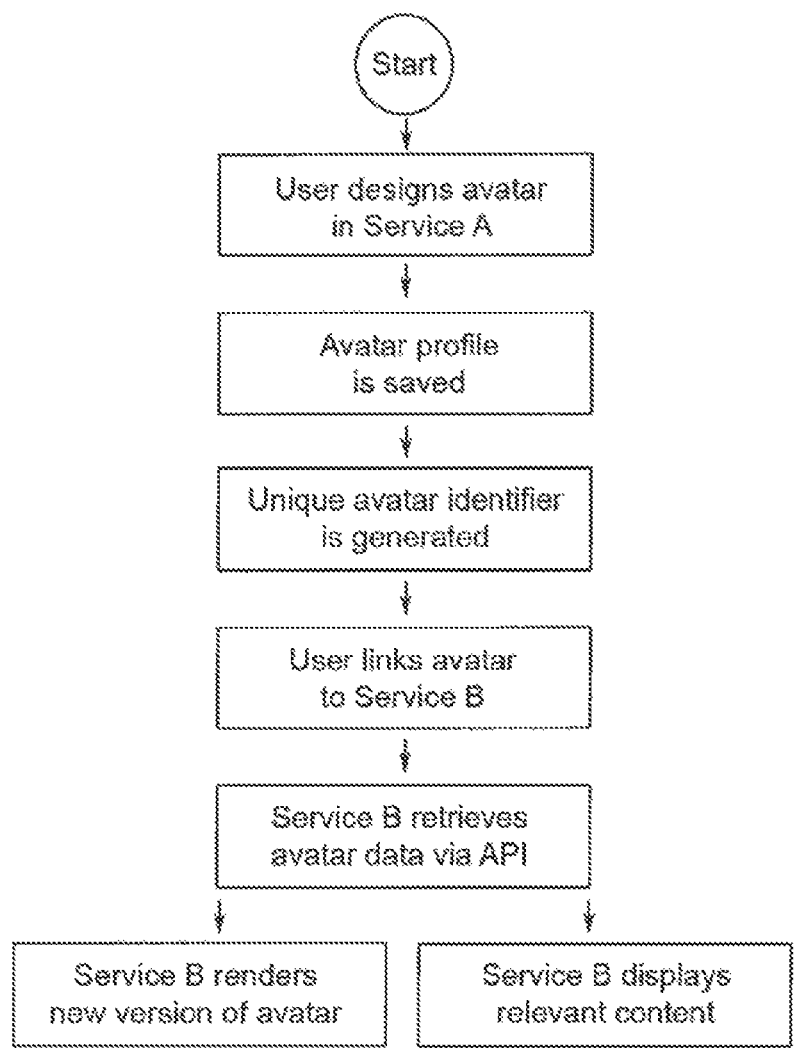
FIG. 4 is workflow diagram illustrating a possible embodiment of the method of the present invention.

A representative workflow in accordance with the method of the present invention is shown in FIG. 4.

In another embodiment, the avatar composition utility defines a series of avatar composition rules that may include, for example, minimum requirements for composing an avatar, so as to ensure that minimum rules for establishing an avatar data set to render an avatar in multiple environments are also met.

The user may save the avatar based on the selected components. If the user is saving the avatar for the first time, the system generates and saves a unique alphanumeric avatar ID and an "avatar profile". An avatar profile includes avatar component data corresponding to each selected component as shown in FIG. 2, additional avatar component data that defines component customizations, such as a component's selected color, size, shape, and relative positioning on the avatar, and "avatar emotion data", which is a code that is generated based the avatar's selected combination of states. For example, if the selected states include eyes=state_1, mouth=state_2, tongue=state_2 and body=state_3, the code assigned to that combination of avatar emotion data may indicate that the avatar is "hungry". Additional avatar component data such as the size and relative positioning of components helps further distinguish one avatar and avatar profile from another, making both the original and any adapted forms of the avatar more unique and recognizable. Avatar emotion data is useful in demonstrating the avatar's personality and emotional or physical state.

Additional avatar components may be defined by the computing device 100 and saved as avatar data by defining a corresponding avatar component. In particular, non-visual data or meta data associated with a respective avatar may also be stored in the avatar dataset in this way, including data related to an emotion, experience, activity, or other non-visual characteristic. Accordingly, not all avatar components in an avatar dataset are intended to be displayed or will be displayed when rendering the avatar in a service environment. However, avatar components not rendered may be used by the service environment to modify other aspects of a display, or to modify the display of other avatar components. For example, an avatar component storing avatar component data representing that the user has participated in an activity, witnessed an event, completed a task, or used the avatar for a particular number of hours, may cause the service environment to display a representative icon, a title, or change the appearance of the avatar to appear stronger, tired, or in other ways.

The avatar ID generated by the system may be displayed to the user, or the user may create a unique username that corresponds to the ID. The avatar profile may further include an identification of a user associated with the avatar, either in the avatar ID itself or separately.

Avatar profiles are stored in a server database and may be made accessible to Environment E through an API. As the avatar designed by the user for Environment A may by stored in a proprietary data format or may include proprietary avatar components, Environment A may be configured to derive and store a "universal" dataset for each avatar based on the avatar dataset. The universal dataset may be stored in a format usable by Environment E for generating a subsequent avatar. Alternatively, the API may provide for any required format conversions on demand upon receiving a request from Environment E for a particular avatar dataset, or avatar component associated with a particular user.

An Environment E may access Environment A's avatar dataset through Environment A's API for the purpose of generating and mapping Environment E's avatar components with Environment A's. Environment E can ask Environment A for its entire dataset, including every individual component and corresponding avatar component data, and then generate any or all components in its own style. Environment E can ask Environment A only for particular subsets of information, such as all avatar components and avatar component data with gender equal to female, for the purpose of, for example, generating its own female-only avatars; or Environment E can ask Environment A only for all subcategories of all categories, for the purpose of, for example, generating one simplified hairstyle to correspond to each subcategory. Environment E may also map each avatar component it generates to corresponding avatar component data in Environment A by adding relevant identifying tags to each component.

In one embodiment of the present invention, the API may be accessed through an avatar data mapping utility (not shown). Such a utility may include a graphical user interface which displays available avatar components and avatar data generated by Environment A. Environment E can generate its own corresponding avatar components in its own style, and then upload, or drag-and-drop, each component beside Environment A's corresponding avatar components. Each matched component automatically generates a relevant identifying tag, which Environment E can export and then use to generate adapted avatars when users connect their avatars from Environment A to Environment E. As above, Environment E may generate and map components to each of Environment A's components, only some components, or only subsets of components. Such a visual utility simplifies and speeds the process of generating and mapping avatar components and data between environments.

In instances where there is no corresponding component in Environment A, a component may be mapped to an arbitrary parallel component. For example, if an avatar in Environment E has the appearance of a cartoon hedgehog, avatar skin color data in Environment A may be mapped to fur color, and avatar clothing data may be discarded. Instead of requesting the entire avatar dataset for a particular identifier, Environment E may request only avatar component data supported by Environment E. Environment E may also request only one or more avatar components from the API. Accordingly, any request from Environment E may specify the avatar component data requested in addition to including identification data. The identification data may identify a particular avatar by avatar identifier, or may include other data or identifiers associated with a particular user, such as name or email address.

A user may enter Environment E and see an option to connect avatar saved in Environment A to Environment E. User enters unique avatar ID or username and password created in Environment A. Environment E sends avatar ID and password to Environment A via API. Environment A then authenticates identity of user. Environment E requests user's avatar component data from Environment A via API, and Environment A sends requested avatar component data. Environment E can ask Environment A for a user's complete avatar profile, or only for avatar component data from that profile that is relevant to Environment E's avatars. For example, Environment E may only require a user's avatar body shape, skin color and hair color, or only require a user's avatar eye color and emotion data. This way, Environment E can choose to automatically modify, adapt, replace or remove any of the user's avatar components. After Environment E receives the requested avatar component data, it generates an adapted version of the user's avatar consisting of Environment E's relevant avatar component data and presents this adapted avatar to the user.

Environment E may offer the user further avatar customization options using its own avatar composition utility, allowing the user to modify existing avatar components, or add new avatar components not present in Environment A, such as accessories, clothing, weapons, etc. The user may save the adapted avatar in Environment E, and Environment E may generate a new avatar profile of the adapted avatar. The avatar profile of the adapted avatar in Environment E may then be sent to Environment A through the API, and Environment A may then make relevant updates to the user's avatar profile in Environment A, such as modifications to hairstyle or additions of new avatar components.

In an embodiment, the present system and method includes an application programming interface or API which may be integrated with a third party service provider's online environment. For example, in one possible implementation, the API may embody programming required to enable the use of the avatar profile to populate the third party online environment with the avatar, or to generate an avatar derivative based on the base avatar profile, and then populate the third party online environment with the resulting derivative avatar. As another illustrative example, the API may include a translator that is operable to translate the avatar profile into a set of instructions that may be processed by the systems associated with the third party online environment to populate the avatar or derivative avatar into the third party online environment.

The creation of avatars that are adaptive and responsive to different online environments and can move seamlessly from one online environment to another online environment provides the possibility of creating a stronger connection between the user and his/her avatar, because the avatar with a common set of components becomes strongly identifiable by the user. In an embodiment, this connection with the user can be leveraged for the purpose of a variety of user engagement scenarios that may bring value to an avatar platform as well as its various participating partners.

By adapting an existing avatar to multiple service environments, it may be possible to reduce the amount of time spent by a user creating or modifying avatars in each environment, which may be referred to as "onboarding" time. New digital applications are being created or modified regularly, each with their own onboarding tasks, including creating user profiles or avatars. While often necessary, creating multiple user profiles across multiple applications is very time consuming. A single application to create, update and manage an adaptable avatar across multiple other applications and platforms would save users time versus creating and updating different avatars for each environment. For example, a user may register for a banking application that shows the user's avatar's mood based on each month's personal spending, a music application that shows the user's avatar dancing whenever music plays, and a video game where the user's avatar has the appearance of a robot. Creating an adaptable avatar once and then connecting to it from each of the three applications would be 75% faster than creating avatars separately in each service; connecting to 10 such applications would be over 90% faster, and so on. For application providers, giving users the option to connect to their adaptable avatars results in faster and simpler onboarding.

Adaptable avatars may assist in establishing a unifying user experience across disparate applications. Each computer software application or service environment may serve a different purpose and may include some necessary differences in features and user interface. Nevertheless, the user of such environments remains a single person, and so the experience of switching between environments can feel disjointed and lack continuity. A personalized and recognizable avatar that may be adapted to fit other contexts helps to establish consistency between otherwise disparate environments. The resulting user experience may feel more harmonious and unified. For example, switching between a location-sharing application and a health-monitoring application while seeing essentially the same avatar gives these very different applications a source of continuity, making the user's overall digital experience feel more seamless. As applications evolve and new ones are introduced, an adaptable and easily updatable avatar also provides users continuity through time.

The present invention promotes for example environments that are based on collaboration between different online operators who may collaborate to provide a single online environment. The system and method provides the ability for an avatar to be rendered seamlessly across multiple associated environments.

Adaptable avatars may increase the relevance of an application to a user. An application may be more useful when the user experience is personalized. An application that does not use avatars, or that uses non-personalized avatars, may be missing a visual cue for making the application and its features personally relevant to users. Allowing users to connect un-adapted portable avatars might add some relevance to the user experience, but it risks creating an unacceptably inconsistent experience because the avatars are not properly contextualized. For example, a weather forecasting application might tell the user how to dress on a given day by showing a generic avatar wearing appropriate clothing; on a warm and rainy day, the avatar might appear in the application wearing a T-shirt and shorts and holding an umbrella. An improvement might be to give the user an option to connect and import an existing un-adapted avatar from another application, but this would make the user experience visually fragmented. Still another improvement might be to give the user the option to create a new avatar from scratch within the application, but this would add a time-consuming customization task and give the user an additional avatar to manage. If such an application integrated with an adaptable avatar system, the user would only need to connect a previously made avatar to the application to see a contextualized version of him- or herself appear in the weather forecast automatically, thereby making it much more personally relevant. For the application provider, each adaptable avatar becomes an immediate and familiar-looking common connection between itself and the user.

Adaptable avatars may increase user engagement in a particular application. Two challenges faced by most applications are initially grabbing users' interest, and then establishing a pattern of behavior so that they become engaged, habitual users. Adaptable avatars provide an ideal mechanism for establishing such user interest and engagement. Users build an affinity for their adaptable avatars through repeated and varied use in multiple applications. Consequently, serving a pre-existing, yet adapted, avatar of a user within the context of a new application may make that application more interesting to the user than applications where either the avatar needs to be created from scratch and therefore has no history with the user, or is previously designed by the user in another application but not adapted. For example, a video game set in a different galaxy might allow a user to connect a pre-existing adaptable avatar, and then automatically generate a new adapted alien version that captures the original avatar's essence by retaining appropriate components, such as eye color, skin tone, and face shape, etc. Presenting such an adapted avatar at the start of the game provides a vehicle for instantly capturing the user's attention and immersing the user in the game. All applications that use an adaptive avatar system become collectively more engaging by giving users a single, unifying visual identity that transcends any one application, thus making the entire digital experience personally meaningful and satisfying as a whole.

Figure 5:
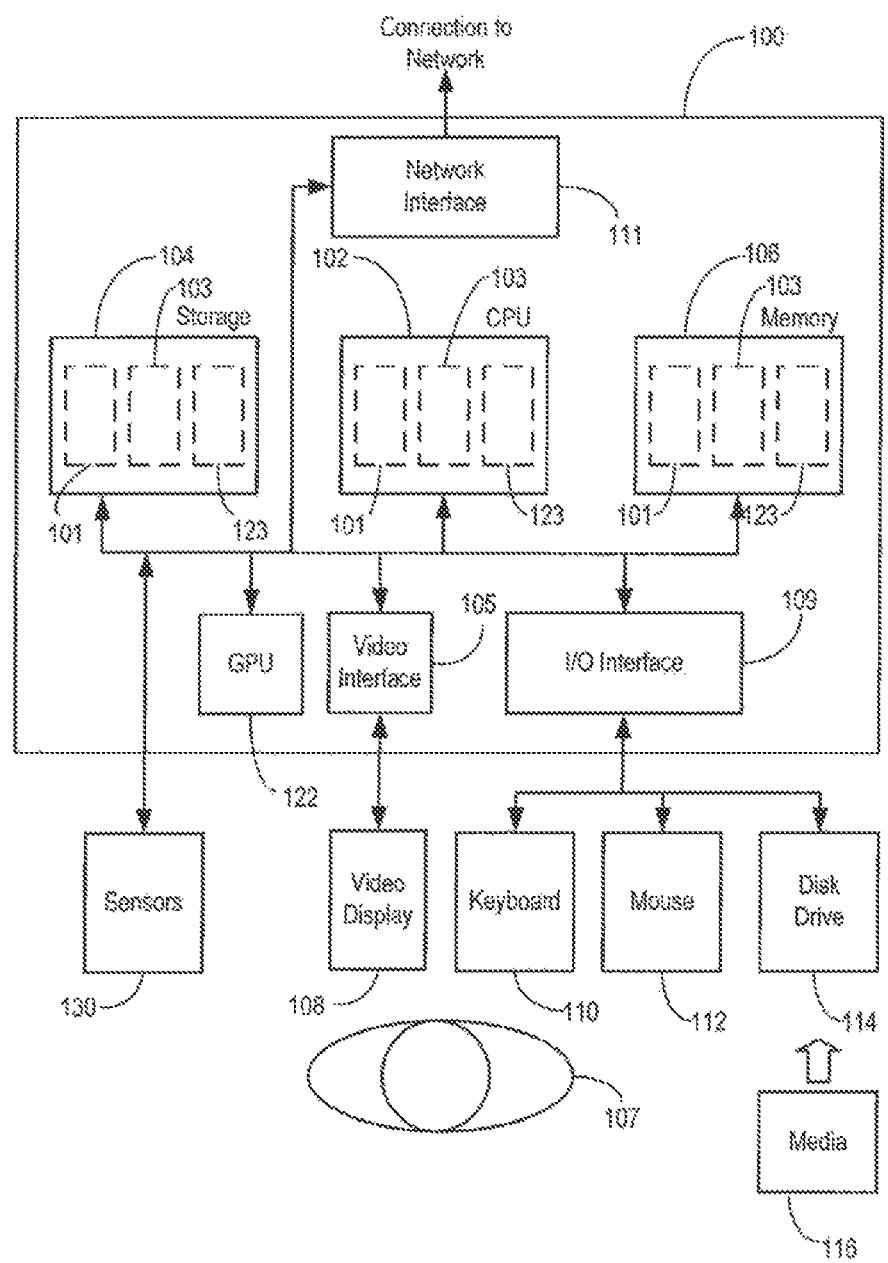
FIG. 5 illustrate a generic computer system which may provide a suitable operating environment for various embodiments.

Referring to FIG. 5, the present system and method may be practiced in various embodiments. A suitably configured generic computer device, and associated communications networks, devices, software and firmware may provide a platform for enabling one or more embodiments as described above. By way of example, FIG. 4 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate through wired or wireless communications with other suitably configured data processing systems (not shown). The generic computer device 100 may be embodied in various form factors including desktop and laptop computers, and wireless mobile computer devices such as tablets, smart phones and super phones operating on various operating systems. It will be appreciated that the present description does not limit the size or form factor of the computing device on which the present system and method may be embodied.

Use Cases

As will be appreciated, the present system and method may be adapted for various use cases. For example, the present system and method may be used to link a user's avatar ID and avatar profile to websites and have their unique versions of a user appear automatically. A user's avatar ID and avatar profile may also be linked to a video game to play as a re-rendered version of the user's avatar in that game's world. Alternatively, the system of the present invention may be linked to a social networking platform, and sign in to the social networking using social networking login information.

The system of the present invention may be configured to extract information relevant to a user to add context to the rendering of the avatar. For example, the system may connect to social media channels in order to extract information regarding the interests of a user, topics or themes of current interest to the user, and so on. This information may be used to adapt content including avatars, as explained herein.

In another use case, the system and method may automatically render different versions of avatars for different occasions or branding purposes. For example, the avatar can automatically turn into a zombie on Halloween, or be modified by clothing or features to represent a popular character in a show.

In another use case, the system and method may be used to improve digital advertising and web technical support by presenting complementary avatars based on a user's avatar component data. The system and method can also improve user profiling by compiling a user's physiological avatar data, such as height and body shape, behavioral avatar data, such as past and current body poses and postures, and emotional history based on past and current avatar emotion data, across multiple environments.

In another use case, the system and method may be used to improve digital advertising by presenting the user's avatar in online advertisements. The system and method may also be used to improve advertising targeting by using avatar component data to glean physiological information, such as height and body shape, or emotional state based on current or historical avatar emotion data, to serve more relevant ads.

In another use case, the system and method can improve content targeting by using avatar component data to glean physiological information, such as height and body shape, or emotional state based on current or historical avatar emotion data, to serve more relevant news, stories, games and videos.

In another use case, users' avatar data may be categorized in aggregate to ascertain distributions in user physiological, behavioural, emotion and other data within and between populations. Aggregate data may be used to correlate avatar data with other digital user activities, such as online shopping and content consumption. Historical and current aggregate data may also be used to build predictive models for real-world activities, such as economic and sociological trends.

In another use case, the system and method can improve personalized content and storytelling by presenting different versions of a user's avatar in custom comics and animation.

In another use case, the system and method may provide branded personalized emoticon packs featuring a user's avatar to represent a particular theme or particular well-known character.

In another use case, the system and method can present custom versions of a user's avatar in e-greeting cards.

In another use case, the present system and method can present custom versions of a user's avatar in different outfits based on body data.

These various use cases may be adapted to virtually any type of media or digital environment.

While illustrative embodiments of the invention have been described above, it will be appreciated that various changes and modifications may be made without departing from the scope of the present invention.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

What is claimed is:

1. A method comprising:
transmitting, by a second computing device having a second service environment related to generation of a second avatar of a user, a request to a first computing device maintaining avatar data describing an avatar component of a first avatar of the user designed for a first service environment, the request identifying the first avatar of the user and the avatar component;

receiving, from the first computing device by the second computing device, the requested avatar component of the first avatar of the user for the first service environment;

extracting, by the second computing device, information regarding the user from a social networking platform, wherein the social networking platform is separate from the first service environment and the second service environment, wherein the information regarding the user from the social networking platform includes at least one of: interests of the user, physiological data of the user, or emotional data of the user;

modifying, by the second computing device, the requested avatar component for the first service environment, based on the information regarding the user from the social networking platform, to create a customized avatar component for the second service environment, wherein the customized avatar component for the second service environment is different from the requested avatar component for the first service environment, and wherein the avatar components are defined and organized relative to one another such that selected avatar components are parsed and used to generate different versions of the avatar that still maintain aspects of the first avatar of the user; and generating, by the second computing device using the second service environment, the second avatar of the user that includes the customized avatar component.

2. A computer system having a second service environment and comprising:

a processor; and memory coupled to the processor and storing instructions that, when executed by the processor, cause the computer system to perform operations comprising:

transmitting a request to a first computing device maintaining avatar data describing an avatar component of a first avatar of a user designed for a first service environment, the request identifying the first avatar of the user and the avatar component;

receiving, from the first computing device, the requested avatar component of the first avatar of the user for the first service environment;

extracting information regarding the user from a social networking platform, wherein the social networking platform is separate from the first service environment and the second service environment, wherein the information regarding the user from the social networking platform includes at least one of: interests of the user, physiological data of the user, or emotional data of the user;

modifying the requested avatar component for the first service environment, based on the information regarding the user from the social networking platform, to create a customized avatar component for the second service environment, wherein the customized avatar component for the second service environment is different from the requested avatar component for the first service environment, and wherein the avatar components are defined and organized relative to one another such that selected avatar components are parsed and used to generate different versions of the avatar that still maintain aspects of the first avatar of the user; and generating, using the second service environment, the second avatar of the user that includes the customized avatar component.

3. The system of claim 2, wherein the avatar data is stored in a common data format that is usable by a wide variety of online environments.

4. The system of claim 2, wherein the second avatar is generated by the second service environment in a way that is contextually relevant and responsive to the user, without the need to deploy substantial technology infrastructure in the second service environment and other service environments.

5. The system of claim 2, wherein the memory further stores instructions for causing the system to perform operations comprising transmitting information relevant to the interaction of the avatar with the second service environment to the first service environment for logging to the profile to enhance the experience of the user in subsequent renderings of the avatar a different version of the avatar.

6. A tangible, non-transitory computer readable medium storing instructions that, when executed by a computer system having a second service environment, cause the computer system to perform operations comprising:

transmitting a request to a first computing device maintaining avatar data describing an avatar component of a first avatar of a user designed for a first service environment, the request identifying the first avatar of the user and the avatar component;

receiving, from the first computing device, the requested avatar component of the first avatar of the user for the first service environment;

extracting information regarding the user from a social networking platform, wherein the social networking platform is separate from the first service environment and the second service environment, wherein the information regarding the user from the social networking platform includes at least one of: interests of the user, physiological data of the user, or emotional data of the user;

modifying the requested avatar component to create a customized avatar component for the second service environment, based on the information regarding the user from the social networking platform, to create a customized avatar component for the second service environment, wherein the customized avatar component for the second service environment is different from the requested avatar component for the first service environment, and wherein the avatar components are defined and organized relative to one another such that selected avatar components are parsed and used to generate different versions of the avatar that still maintain aspects of the first avatar of the user; and generating, using the second service environment, the second avatar of the user that includes the customized avatar component.

\* \* \* \* \*